(12) United States Patent
Miyazaki et al.

(10) Patent No.: US 7,064,494 B2
(45) Date of Patent: Jun. 20, 2006

(54) DISCHARGE LAMP OPERATING APPARATUS AND SELF-BALLASTED ELECTRODELESS DISCHARGE LAMP

(75) Inventors: Kouji Miyazaki, Hirakata (JP); Toshiaki Kurachi, Hirakata (JP); Mitsuharu Kawasaki, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 767 days.

(21) Appl. No.: 10/121,003

(22) Filed: Apr. 11, 2002

(65) Prior Publication Data

US 2002/0180377 A1 Dec. 5, 2002

(30) Foreign Application Priority Data

Apr. 12, 2001 (JP) .............................. 2001-113663

(51) Int. Cl.
*H05B 37/02* (2006.01)

(52) U.S. Cl. ...................................... 315/219; 315/224

(58) Field of Classification Search .................. 363/17, 363/37; 315/248, 225, 209 R, 244, 291, 315/224, 209

See application file for complete search history.

(56) References Cited

U.S. PATENT DOCUMENTS

| | | | |
|---|---|---|---|
| 5,416,386 A * | 5/1995 | Nilssen ..................... | 315/209 R |
| 5,449,979 A * | 9/1995 | Ueoka et al. ................ | 315/225 |
| 5,453,667 A * | 9/1995 | Matsuda et al. ............. | 315/248 |
| 5,771,159 A * | 6/1998 | Sako et al. ..................... | 363/17 |
| 5,777,861 A * | 7/1998 | Shimizu et al. ................ | 363/37 |
| 5,796,214 A | 8/1998 | Nerone | |
| 5,801,492 A * | 9/1998 | Bobel .......................... | 315/244 |

FOREIGN PATENT DOCUMENTS

| | | |
|---|---|---|
| EP | 1 098 552 A2 | 5/2001 |
| EP | 1098552 * | 5/2001 |
| JP | 09320541 A | 12/1997 |
| JP | 10154590 A | 6/1998 |
| JP | 10162983 A | 6/1998 |
| JP | 10172776 A | 6/1998 |
| JP | 10208702 A | 8/1998 |
| JP | 10 84633 * | 12/1999 |
| JP | 11345693 A | 12/1999 |
| JP | 2000048990 A | 2/2000 |
| JP | 2000285712 A | 10/2000 |
| JP | 2000353598 A | 12/2000 |
| JP | 2001015290 A | 1/2001 |
| JP | 2001196194 A | 7/2001 |
| WO | WO 99/67977 | 12/1999 |

* cited by examiner

*Primary Examiner*—Thuy V. Tran
*Assistant Examiner*—Hung Tran Vy
(74) *Attorney, Agent, or Firm*—Harness, Dickey & Pierce, P.L.C.

(57) ABSTRACT

A discharge lamp operating apparatus includes a DC power circuit portion for outputting a DC voltage; an inverter circuit including a switching element provided with a control terminal for converting an output from the DC power circuit portion to an AC voltage; a control terminal driving circuit for controlling the switching element provided with a control terminal to be on or off; and a resonant load circuit including a discharge lamp, a first inductor and a first capacitor. The control terminal driving circuit includes a drive winding mutually coupled to the first inductor; a series circuit of a voltage clamp element and an impedance element, the series circuit being connected to at least one end of the drive winding, and the control terminal driving circuit is configured to control the switching element provided with a control terminal to be on or off by a voltage generated at the drive winding.

8 Claims, 6 Drawing Sheets

DISCHARGE LAMP OPERATING APPARATUS AND SELF-BALLASTED ELECTRODELESS DISCHARGE LAMP

BACKGROUND OF THE INVENTION

The present invention relates to an operating apparatus for operating a discharge lamp (discharge lamp operating apparatus) and a self-ballasted electrodeless discharge lamp.

In recent years, as discharge lamp operating apparatuses, electronically operating apparatuses (inverter) are widely used in view of improvement of luminous efficiency, and compactness and lightness of an apparatus. Examples of such a discharge lamp operating apparatus are disclosed in Japanese Laid-Open Patent Publication Nos. 10-162983 and 2000-353598. The conventional discharge lamp operating apparatuses will be described below.

FIG. 6 shows the structure of the discharge lamp operating apparatus disclosed in Japanese Laid-Open Patent Publication No. 2000-353598. The discharge lamp operating apparatus shown in FIG. 6 includes a DC power 22, an inverter circuit 31, a control terminal driving circuit 23, and a resonant load circuit 30 including a fluorescent lamp 8.

The DC power 22 includes an AC power 1, a noise prevention capacitor 2, a diode bridge 3 and a smoothing capacitor 4, and the structure of the DC power 22 is a common structure in which the alternating current of the AC power 1 is converted to a direct current and output the direct current. The inverter circuit 31 includes FETs 5 and 6, which are switching elements with control terminals (gate). In the inverter circuit 31, the FETs 5 and 6 are turned on or off alternately, so that the direct current is converted to an alternating current. The FETs 5 and 6 are controlled to be on or off by the control terminal driving circuit 23, and the control terminal driving circuit 23 includes a secondary winding 10A of a transformer 10, which is a drive winding, and a capacitor 14, a second capacitor 17, Zener diodes 15 and 16, which are voltage clamp elements, resistors 12, 13, and 19, and a second inductor 11.

The fluorescent lamp 8, which is a discharge lamp, is a part of the resonant load circuit 30, and the resonant circuit 30 includes the fluorescent lamp 8, a first capacitor 7, a capacitor 9 for preheating electrodes 8A and 8B of the fluorescent lamp 8, a primary winding 10B of the transformer 10, which is a first inductor.

In the structure as described above, a direct current output from the DC power 22 is converted to be an alternating current by the control terminal driving circuit 23 turning the FETs 5 and 6 on or off alternately, and the alternating current is applied to the resonant load circuit 30, so that the fluorescent lamp 8 can be operated with the alternating current.

Next, the operation of the discharge lamp operating apparatus having the structure shown in FIG. 6 will be described.

When the AC power 1 is turned on, a pulsating current waveform that has been full-wave rectified by the rectifier 3 is smoothed by the capacitor 4, and a DC voltage that substantially corresponds to the peak value of the AC power 1 is generated at both ends of the capacitor 4.

The DC voltage generated at both ends of the capacitor 4 is applied to a series circuit of the FETs 5 and 6, which is the inverter circuit 31, and also applied to a series circuit of the resonant load circuit 30 and the resistor 19 so as to charge the capacitors 7 and 9.

At the same time, the DC voltage generated at both ends of the capacitor 4 is applied to a series circuit of the resistor 12, the inductor 11, the secondary winding 10A of the transformer 10, the capacitor 14, and the resistor 19 in the control terminal driving circuit 23, and the capacitor 14 is charged with charges at a predetermined time constant. The maximum voltage that can be generated at both ends of the capacitor 14 is not more than a voltage that is generated at both ends of the resistor 13 when the DC voltage generated at both ends of the capacitor 4 is divided between the resistors 12, 13, and 19.

In this case, when the voltage of the capacitor 14 charged at a predetermined time constant reaches the Zener voltage of the Zener diode 15, the charges of the capacitor 14 are supplied to the gate terminal of the FET 5 so that the FET 5 is turned on. When the FET 5 is turned on, the charges charged to the capacitors 7 and 9 are discharged via the FET 5 and the primary winding 10B of the transformer 10. Here, the current flowing through the primary winding 10B of the transformer 10 generates an induced voltage in the secondary winding 10A of the transformer 10, and the induced voltage in the secondary winding 10A of the transformer 10 allows the series resonant circuit constituted by the inductor 11 and the capacitor 17 to oscillate at a resonance frequency determined by the inductor 11 and the capacitor 17, so that an oscillation voltage is generated at both ends of the capacitor 17.

This oscillation voltage keeps the FET 5 on for a predetermined period, and thereafter a voltage in the reverse bias direction is generated between the gate and the source of the FET 5, so that the FET 5 is turned off. At the same time, a voltage in the forward bias direction is applied between the gate and the source of the FET 6, so that the FET 6 is turned on. When the FET 6 is turned on, using the DC voltage generated at both ends of the capacitor 4 as the power source, a current flows through the capacitor 7, the fluorescent lamp 8, the primary winding 10B of the transformer 10, and the FET 6. This current allows the capacitors 7 and 9 to be charged.

In this case, the current flowing through the primary winding 10B of the transformer 10 flows in a direction opposite to the direction when the FET 5 is on, and an induced voltage having a polarity opposite to that in the above case is generated in the secondary winding 10A of the transformer 10, and an oscillation operation is performed at a resonance frequency determined by the inductor 11 and the capacitor 17 and an oscillation voltage is generated at both ends of the capacitor 17. This oscillation voltage keeps the FET 6 on for a predetermined period, and thereafter a voltage in the reverse bias direction is generated between the gate and the source of the FET 6, so that the FET 6 is turned off. At the same time, a voltage in the forward bias direction is applied between the gate and the source of the FET 5, so that the FET 5 is turned on.

Thereafter, the FETs 5 and 6 repeat to be on or off alternately, so that an alternating current is applied to the resonant load circuit 30. When the alternating current is applied to the resonant load circuit 30 and immediately after the AC power 1 is introduced, the current flows through the capacitor 7, the electrode 8A, the capacitor 9, the electrode 8B, and the primary winding 10B of the transformer 10 so that a preheating current is supplied to the electrodes 8A and 8B of the fluorescent lamp 8. Since the resonant load circuit 30 constitutes a series resonant circuit, a high voltage as a resonance voltage is generated at both ends of the capacitor 9 when the preheating current is supplied.

Then, the temperature of the electrodes is increased by the preheating current to the electrodes 8A and 8B, so that thermoelectrons are easily generated and the high voltage at both the ends of the capacitor 9 is applied to both ends of the fluorescent lamp 8. Therefore, the fluorescent lamp 8 starts discharge. When the fluorescent lamp 8 starts discharge, the impedance of the fluorescent lamp 8 is decreased, and most of the current flowing through the capacitor 7 flows through the fluorescent lamp 8 so that stable discharge can be maintained.

According to the conventional structure, the fluorescent lamp 8 can be operated without particular problems, but when the inventors of the present invention made experiments regarding the operation when the fluorescent lamp 8 having electrodes is replaced by an electrodeless fluorescent lamp, it was found that the electrodeless fluorescent lamp with this structure was not operated reliably. Furthermore, it was also found that in the case of the fluorescent lamp 8 having electrodes, this structure was not sufficient to operate the fluorescent lamp 8 reliably in any environment.

On the other hand, adding significant changes to the structure of the operating apparatus for operating the fluorescent lamp 8 results in an increase of the cost of products, and it is also necessary to examine the structure with the added changes carefully whether or not any new problem may be caused.

SUMMARY OF THE INVENTION

Therefore, with the foregoing in mind, it is a main object of the present invention to provide a discharge lamp operating apparatus with a simple structure that can operate a fluorescent lamp reliably.

A discharge lamp operating apparatus of the present invention includes a DC power circuit portion for outputting a DC voltage; an inverter circuit including a switching element provided with a control terminal for converting an output from the DC power circuit portion to an AC voltage; a control terminal driving circuit for controlling the switching element provided with a control terminal to be on or off, and a resonant load circuit including a discharge lamp, a first inductor and a first capacitor. The control terminal driving circuit includes a drive winding mutually coupled to the first inductor; a series circuit of a voltage clamp element and an impedance element, the series circuit being connected to at least one end of the drive winding, and the control terminal driving circuit is configured to control the switching element provided with a control terminal to be on or off by a voltage generated at the drive winding.

In one preferable embodiment, the control terminal driving circuit further includes a second capacitor connected in parallel to the series circuit of the voltage clamp element and the impedance element, and the voltage clamp element becomes conductive when an alternating current signal generated in the second capacitor is a predetermined value or more.

In one preferable embodiment, the control terminal driving circuit further includes a second inductor, and a closed circuit is formed by the drive winding, the second capacitor and the second inductor.

It is preferable that the lower limit of the resistance of the impedance element is 10 Ω.

It is preferable that the upper limit of the resistance of the impedance element is 500 Ω.

In one preferable embodiment, the impedance element is a resistor.

A self-ballasted electrodeless discharge lamp of the present invention includes an electrodeless discharge lamp, a ballast for supplying power to the electrodeless discharge lamp, and a lamp base that are formed into one piece. The ballast includes a DC power circuit portion for outputting a DC voltage that is electrically connected to the lamp base; an inverter circuit including a switching element provided with a control terminal for converting an output from the DC power circuit portion to an AC voltage; a control terminal driving circuit for controlling the switching element provided with a control terminal to be on or off; and a resonant load circuit including the electrodeless discharge lamp, a first inductor and a first capacitor. The control terminal driving circuit includes a drive winding mutually coupled to the first inductor; a series circuit of a voltage clamp element and an impedance element that is connected to at least one end of the drive winding, and the control terminal driving circuit is configured to control the switching element provided with a control terminal to be on or off by a voltage generated at the drive winding.

In one preferable embodiment, the self-ballasted electrodeless discharge lamp further includes a lighting cover for covering the electrodeless discharge lamp, the ballast and the lamp base that has an opening in a light emitting direction.

According to the present invention, the control terminal driving circuit includes a series circuit of a voltage clamp element and an impedance element that is connected to at least one end of a drive winding, so that a discharge lamp operating apparatus that can operate a fluorescent lamp reliably can be realized simply by adding the impedance element. When the discharge lamp operating apparatus of the present invention is a self-ballasted electrodeless discharge lamp, it is necessary to reduce the discrepancy between the resonant frequency of the resonant load circuit and the on/off frequency of the inverter circuit, and therefore the present invention provides a larger advantage.

DETAILED DESCRIPTION OF THE INVENTION

Figure 1:
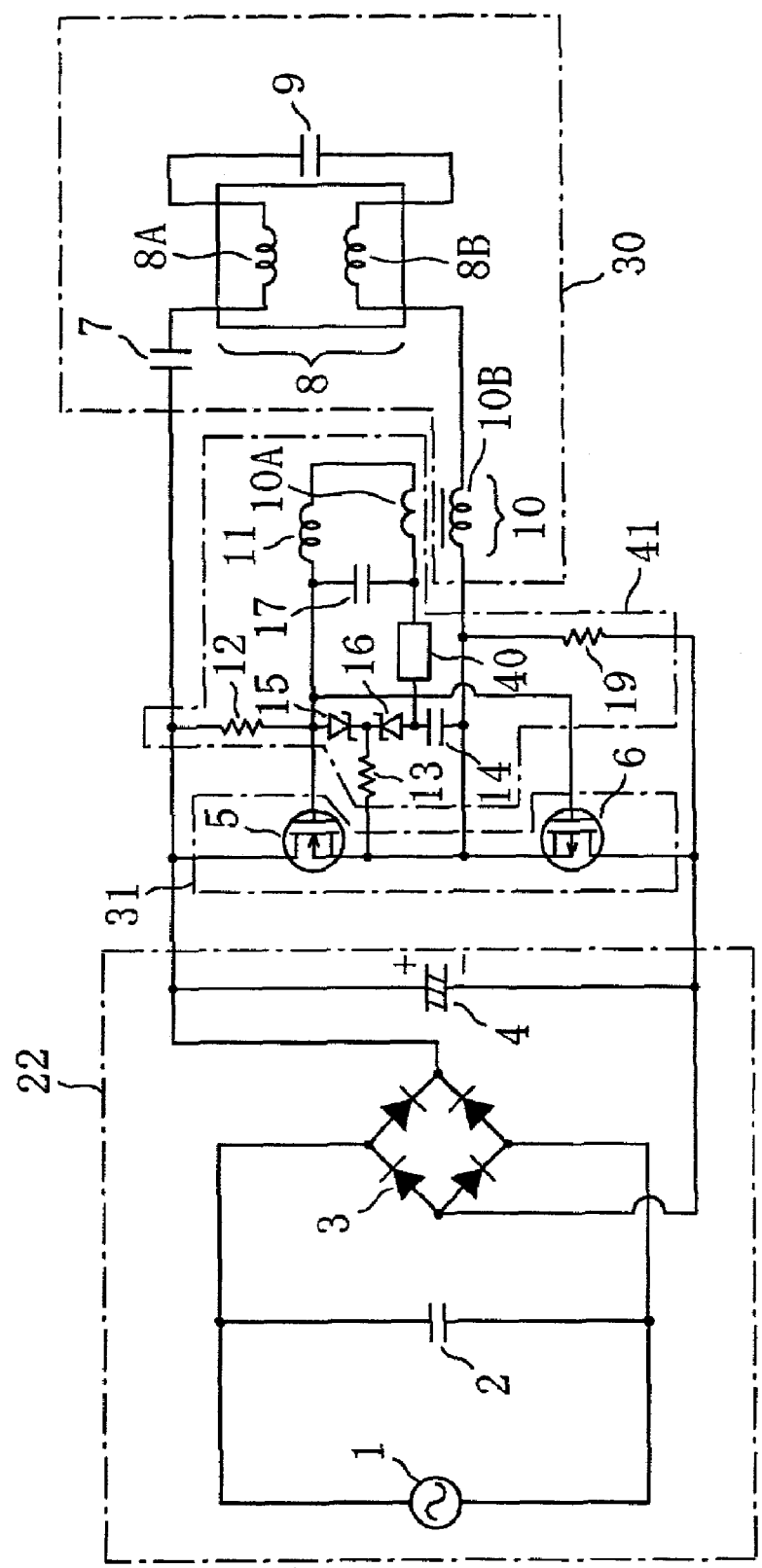
FIG. 1 is a circuit diagram showing the structure of a discharge lamp operating apparatus of Embodiment 1 according to the present invention.

The inventors of the present invention clarified the mechanism that prevents the conventional structure from operating a fluorescent lamp reliably, and succeeded in reliably generating a high voltage at both ends of the capacitor connected to the fluorescent lamp so as to achieve reliable operation of the fluorescent lamp, and thus achieved the present invention.

Hereinafter, the reason why the conventional structure fails to operate a fluorescent lamp reliably will be described. First, the inventors of the present invention noted that in the structure shown in FIG. 6, the voltage generated at both ends of the primary winding 10B of the transformer 10 is very different between before and after the fluorescent lamp 8 starts discharge, and continued further in-depth examinations.

During a period in which a preheating current is supplied to the electrodes 8A and 8B before discharge is started, the electrodes 8A and 8B of the resonant load circuit 30 have a low resistance of about several Ω, so that it can be said that the resonant load circuit 30 is equivalent to a simple series resonant circuit of the capacitors 7 and 9 and the primary winding 10B of the transformer 10.

Since it is necessary to generate a high voltage at both ends of the capacitors 9 for the start of operation at the time of starting the fluorescent lamp 8, the inverter circuit 31 is turned on or off in the vicinity of the resonance frequency. Thus, the input impedance of the resonant load circuit 30 is decreased, so that a large current flows. As a result, a high voltage is also generated at both ends of the primary winding 10B of the transformer 10.

On the other hand, once that the fluorescent lamp 8 is operated, the structure is changed to be such in which a discharge impedance of the fluorescent lamp 8 is inserted in parallel to the capacitor 9. In this case, in general, the discharge impedance is far much smaller than the impedance of the capacitor 9. Therefore, a series circuit of the capacitor 7, the discharge impedance and the primary winding 10B of the transformer 10 constitutes an equivalent circuit of the resonant load circuit 30. For this reason, the current flowing through the resonant load circuit 30 is restricted by the discharge impedance and is decreased, and as a result, the voltage at both ends of the primary winding 10B of the transformer 10 becomes much smaller than that before discharge is started.

Here, the voltage proportional to the voltage generated at both ends of the primary winding 10B of the transformer 10 is also generated at the secondary winding 10A, and also the voltage at both ends of the secondary winding 10A is large before discharge is started and becomes small after discharge is started.

As described above, series resonant circuit constituted with the inductor 11 and the capacitor 17 oscillate at a resonance frequency A by the induced voltage of the secondary winding 10A, and an oscillation voltage is generated at both ends of the capacitor 17. In addition, the FETs 5 and 6 are operated to be on or off, depending on the cycle of the oscillation voltage. Therefore, during a period in which the amplitude of the induced voltage of the secondary winding 10A is large before the fluorescent lamp 8 starts discharge, the amplitude of the oscillation voltage generated at the capacitor 17 is also large.

At this point, the oscillation voltage is a voltage equal to or more than the Zener voltage of the Zener diodes 15 and 16 connected in parallel to the capacitor 17, so that the Zener diodes 15 and 16 are turned on. As a result, it seems that the impedance at both ends of the capacitor 17 drops drastically. Consequently, the resonance frequency A is decreased and thus the on/off frequency of the FETs 5 and 6 is decreased. When the on/off frequency of the FETs 5 and 6 becomes much lower than the resonance frequency of the resonant load circuit 30, the voltage generated at both ends of the capacitor 9 is decreased. As a result, the fluorescent lamp 8 may fail to be operated.

Under regular conditions that operate easily the fluorescent lamp, the lamp can be operated without particular problems in many cases, even if a discrepancy from the resonance frequency is increased to some extent. However, under conditions that operate the fluorescent lamp with difficulty (e.g., at the time of low temperatures), it may be difficult to operate the fluorescent lamp. It is one of the most serious problems to a user of the lamp that it is difficult to operate the lamp. Furthermore, when an electrodeless discharge lamp, which generally is more difficult to operate than a fluorescent lamp having electrodes, is used (especially when a metal is present around it), it may be difficult to operate the lamp.

Figure 6:
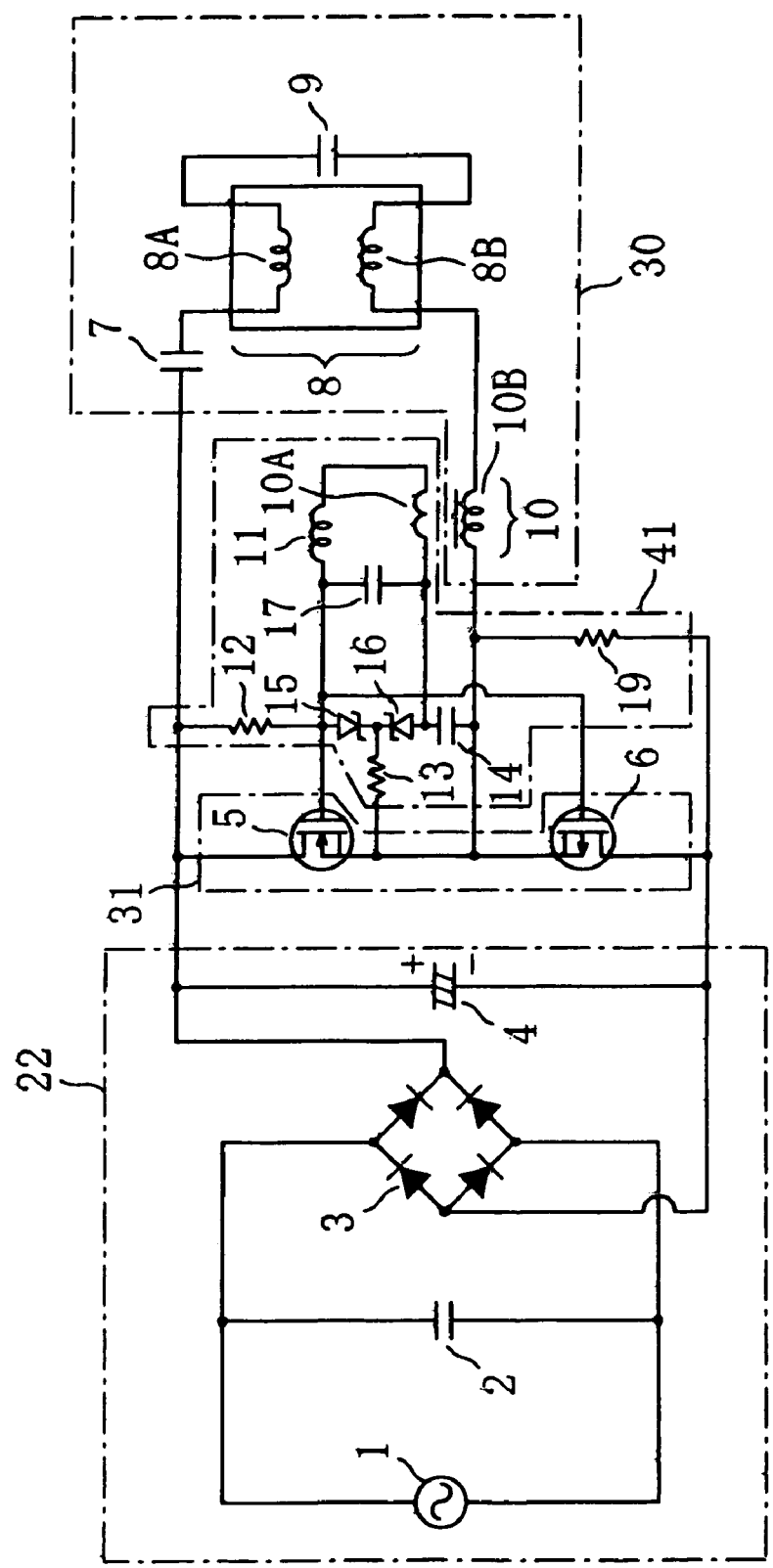
FIG. 6 is a circuit diagram showing the structure of a conventional discharge lamp operating apparatus.

Conventionally, even under conditions that operate the lamp with some difficulty, partly because the fluorescent lamp 8 is a lamp that can be operated comparatively easily, the fluorescent lamp 8 was operated with the structure shown in FIG. 6 without problems. Therefore, the inconveniences as described above that were specified by the inventors of the present invention had not been problems. However, even if the lamp with the conventional structure can be operated without problems, the fluorescent lamp tends to be designed so as to be operated with more difficulty today or in the future, and as this tendency becomes more intense, it is more important to develop an operating apparatus that can operate a lamp reliably.

That is to say, for the purpose of achieving compactness, many efforts in the design such as a reduction of the diameter of the bulb of the fluorescent lamp, an increase of the distance between the electrodes, or a more complicated shape have been attempted. As such a design is increased, an operating apparatus that can operate a lamp reliably has a larger technical importance. This is also true for the structure of a self-ballasted fluorescent lamp that can directly replace an incandescent lamp. Furthermore, self-ballasted fluorescent lamps for electrodeless discharge lamps also have been recently developed, so that if self-ballasted electrodeless fluorescent lamps are widely spread, it seems that a demand for an operating apparatus that can operate electrodeless discharge lamps reliably even under conditions that operate a fluorescent lamp with electrodes with difficulty is increased.

Hereinafter, embodiments of the present invention will be described with reference of the accompanying drawings. In the following drawings, for simplification of description, elements having substantially the same function bear the same reference numeral. The present invention is not limited to the following embodiments.

EMBODIMENT 1

Figure 2:
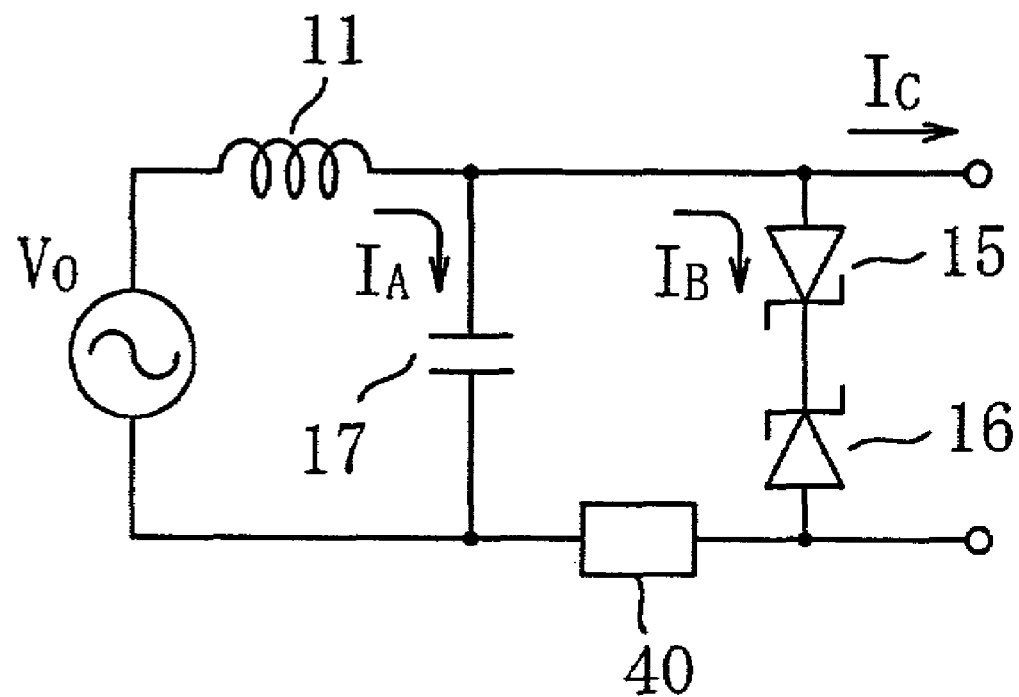
FIG. 2 is a circuit diagram showing a part of a control terminal driving circuit 41.

A discharge lamp operating apparatus of Embodiment 1 of the present invention will be described with reference to FIGS. 1 and 2. FIG. 1 schematically shows the structure of the discharge lamp operating apparatus of this embodiment.

The discharge lamp operating apparatus of this embodiment includes a DC power circuit portion 22 that outputs a DC voltage, an inverter circuit 31 including switching elements provided with control terminals (5 and 6) that converts the output from the DC power circuit portion 22 to an AC voltage, a control terminal driving circuit 41 for controlling the switching elements provided with control terminals (5 and 6) to be on or off, and a resonant load circuit 30. The resonant load circuit includes a discharge lamp 8, a first inductor 10B, and a first capacitor 7 and a capacitor 9.

The control terminal driving circuit 41 includes a series circuit of a drive winding 10A mutually coupled to a first inductor 10B, voltage clamp elements (15 and 16) and an impedance element 40. This series circuit is connected to at least one end of the drive winding 10A, and in this embodiment, the voltage clamp elements (15 and 16) are Zener diodes, and as shown in FIG. 1, the impedance element 40 is inserted between the Zener diodes and one end of the drive winding 10A. The control terminal driving circuit 41 is configured so as to control the switching elements provided with control terminals (5 and 6) to be on or off with the voltage generated at the drive winding 10A.

The structure shown in FIG. 1 is basically the same as that shown in FIG. 6 except that the impedance element 40 is inserted in series with the Zener diodes 15 and 16, which are voltage clamp elements. Therefore, the portions common between this embodiment and the structure shown in FIG. 6 have the same structures.

The DC power circuit portion 22 includes a noise prevention capacitor 2, a diode bridge 3, and a smoothing capacitor 4, and converts the alternating current from the AC power 1 to a direct current and outputs the direct current in this embodiment. However, it is sufficient that the DC power circuit portion 22 has a structure that allows a DC voltage to be output, so that it can be a DC power that directly outputs a DC voltage without using an AC power or a commercial power.

The inverter circuit 31 includes FETs 5 and 6, which are switching elements provided with control terminals (gate). In the inverter circuit 31, the FETs 5 and 6 are turned on or off alternately, so that a direct current is converted to an alternating current. The FETs 5 and 6 are controlled to be on or off by the control terminal driving circuit 41. The resonant circuit 30 includes a first capacitor 7, a fluorescent lamp 8 that is a discharge lamp, a capacitor 9 for preheating electrodes 8A and 8B of the fluorescent lamp 8, a primary winding 10B of a transformer 10, which is a first inductor.

Next, the outline of the operation when the impedance element 40 is inserted will be described with reference to FIG. 2. FIG. 2 is a circuit diagram showing a part of the control terminal driving circuit 41 of this embodiment. In FIG. 2, the AC voltage generated at both ends of the secondary winding 10A of the transformer 10 is referred to as V0.

As described above, the voltage generated at both ends of the secondary winding 10A of the transformer 10 is very different between before and after the fluorescent lamp 8 starts discharge. For this reason, the amplitude of V0 is large and the amplitude of the voltage generated at the capacitor 17 is large before discharge is started, and therefore the Zener diodes 15 and 16 are turned on, so that current IB flows. This current IB is not taken into consideration in the conventional structure shown in FIG. 6.

In this embodiment, the impedance element 40 is inserted, so that the current IB can be controlled. That is to say, current is restricted by the impedance element 40, so that the current IB can be restricted so as to be very small. Therefore, in the structure of this embodiment, most of the output current from the power V0 flows through the inductor 11 and the capacitor 17. On the other hand, after the fluorescent lamp 8 starts discharge, the amplitude of V0 becomes small, so that the voltage generated at the capacitor 17 becomes small. As a result, the Zener diodes 15 and 16 are not turned on, or even if they are turned on, the conduction period is very short, and therefore most of the output current from the power V0 flows through the inductor 11 and the capacitor 17.

The above-described operation makes it possible that the output current from the power V0 is mostly IA, and the current IB can be very small. Consequently, the FETs 5 and 6 can be operated so as to be on or off, by using the resonance frequency of the inductor 11 and the capacitor 17 at any occasions, so that the voltage that can start the fluorescent lamp 8 reliably can be generated at both ends of the capacitor 9 of the resonant load circuit 30. As a result, the fluorescent lamp 8 can be started reliably.

The impedance element 40 in this embodiment is a resistor. When the impedance of the impedance element 40 is too small, the current IB becomes large, but the examination of the inventors of the present invention confirmed that when the impedance is 10 Ω or more, the fluorescent lamp 8 can be started reliably. A current Ic shown in FIG. 2 is a signal current for turning the FETs 5 and 6 on or off, and when the current Ic is too small, a loss at the time when the FETs 5 and 6 are turned on or off becomes large. Therefore, the resistance of the impedance element 40 is preferably 500 Ω or less.

Figure 3:
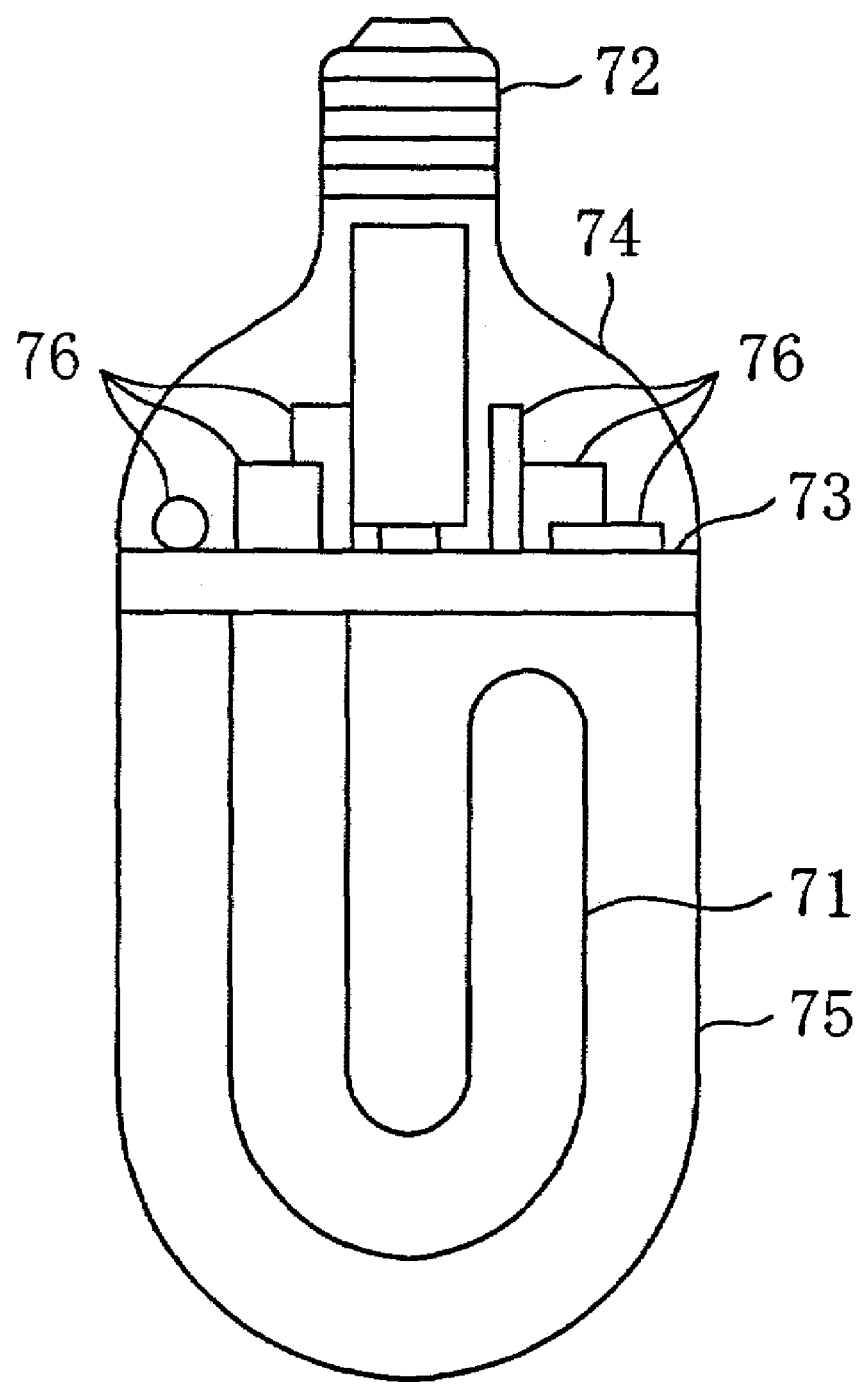
FIG. 3 is a schematic view showing the structure of a self-ballasted fluorescent lamp.

The discharge lamp operating apparatus of this embodiment can be configured as a self-ballasted fluorescent lamp as shown in FIG. 3. FIG. 3 schematically shows the structure of the self-ballasted fluorescent lamp of this embodiment.

The self-ballasted fluorescent lamp of this embodiment as shown in FIG. 3 includes a fluorescent lamp 71 obtained by bending the shape of the fluorescent lamp 8 shown in FIG. 1, a lamp base 72 such as a E26 type lamp base for incandescent lamps, a circuit substrate 73 provided with various circuit components 76 on which wiring of the structure of the ballast shown in FIG. 1 is formed, a cover 74 whose one end is provided with the lamp base 72 for accommodating the circuit substrate 73 inside, a translucent globe 75 disposed so as to enclose the fluorescent lamp 71. The wattage of the self-ballasted fluorescent lamp shown in FIG. 3 is 13 W. The conditions of the fluorescent lamp 71 are as follows, for example: The diameter of the bulb (outer diameter) is 10.75 mm, the thickness of the glass is 0.8 mm, and the distance between the electrodes is 300 mm.

The fluorescent lamp 71 and the circuit substrate 73 are electrically connected, and the circuit substrate 73 and the lamp base 72 are electrically connected, although not shown in FIG. 3, and power is supplied by threading the lamp base 72 to a socket for an incandescent lamp, so that the fluorescent lamp 71 is operated. The circuit substrate 73 is provided with various circuit components 76 constituting a ballast, but FIG. 3 only shows typical components.

As shown in FIG. 3, in the structure of the self-ballasted fluorescent lamp, a small fluorescent lamp 71 having a comparatively small bulb diameter is disposed while being bent in a small space, so that the startability is poorer because of this structure. Even if the lamp is such a self-ballasted fluorescent lamp having a comparatively poor startability, the structure of this embodiment can start the fluorescent lamp 8 reliably. Therefore, the structure of this embodiment can be applied to the structure of the self-ballasted fluorescent lamp preferably.

In the self-ballasted fluorescent lamp shown in FIG. 3, the mounting area of the circuit substrate 73 is comparatively small, so that it is difficult to perform significant addition or change of the circuit or the elements in practice. However, the structure of this embodiment is obtained simply by adding a resistor as the impedance element 40, and therefore has the advantage that the circuit structure of this embodiment can be realized easily even in the self-ballast fluorescent lamp that has a limitation on the area for mounting. That is to say, the resistor has a comparatively small size, so that it can be mounted easily on the circuit substrate 73 of the self-ballasted fluorescent lamp having a comparatively small mounting area. Furthermore, the structure employing a resistive element is comparatively simple and can be realized at a low cost, so that this is advantageous in that respect.

As described above, in the discharge lamp operating apparatus of this embodiment, the control terminal driving circuit for controlling the switching elements provided with control terminals included in the inverter circuit is configured so as to have a series circuit of the voltage clamp elements and the impedance element at at least one end of the drive winding. With such a simple structure, a high voltage for starting to operate a discharge lamp can be generated. As a result, the discharge lamp operating apparatus can operate a discharge lamp reliably, even if the discharge lamp is used in any environment.

Furthermore, with the minor change in the structure of adding the impedance element, the structure of this embodiment can be realized, which means that a conventional production line can be used as it is, so that there is another advantage that the cost cannot be increased very much. In addition, as the impedance element, a comparatively inexpensive resistor can be used, which is a large merit as well. Moreover, since a change in the structure is small, it is easy to predict operation in the changed structure, which provides another merit that a period for development and examination of products can be short.

EMBODIMENT 2

Figure 4:
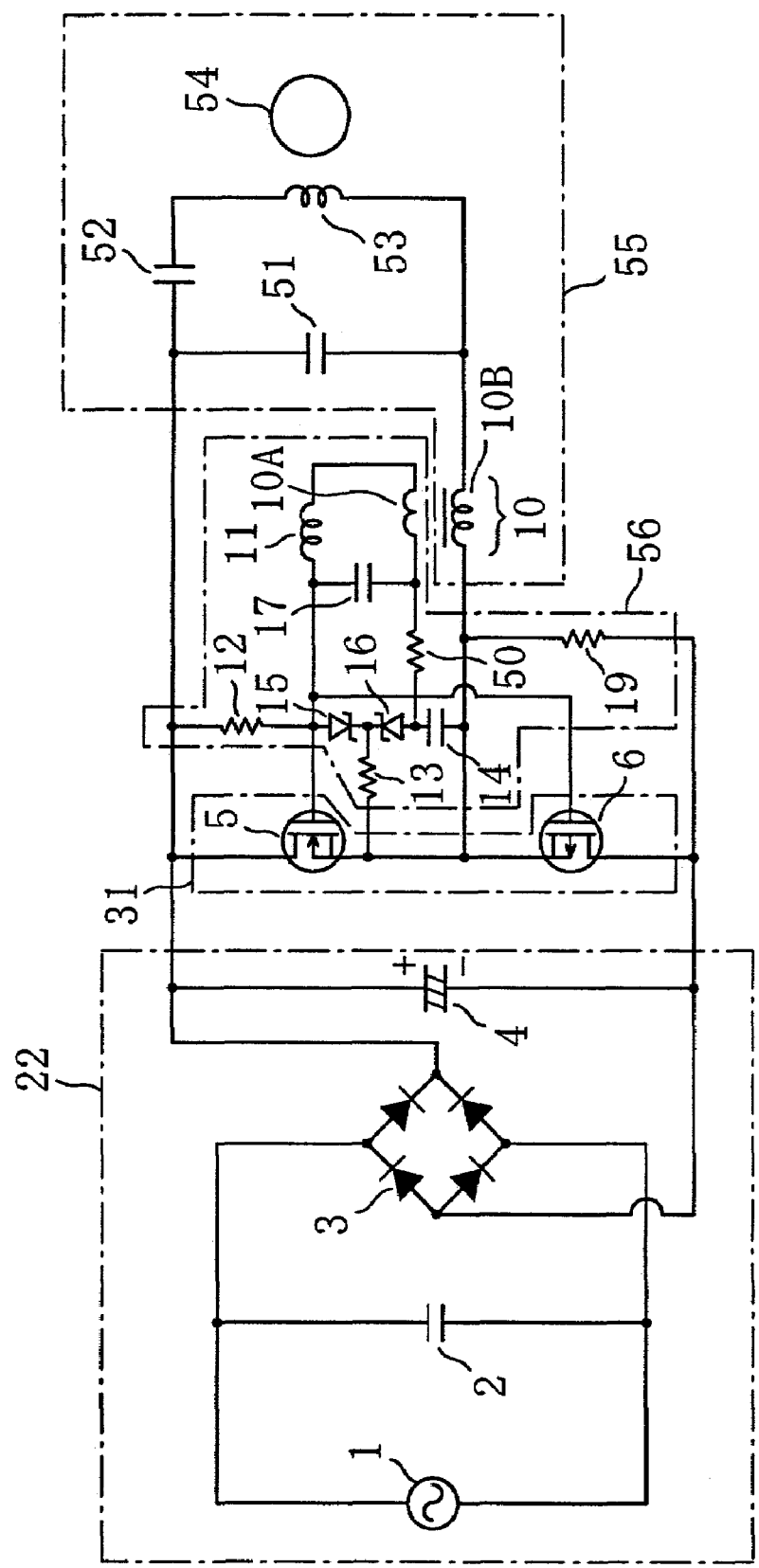
FIG. 4 is a circuit diagram showing the structure of a discharge lamp operating apparatus of Embodiment 2 according to the present invention.
Figure 5:
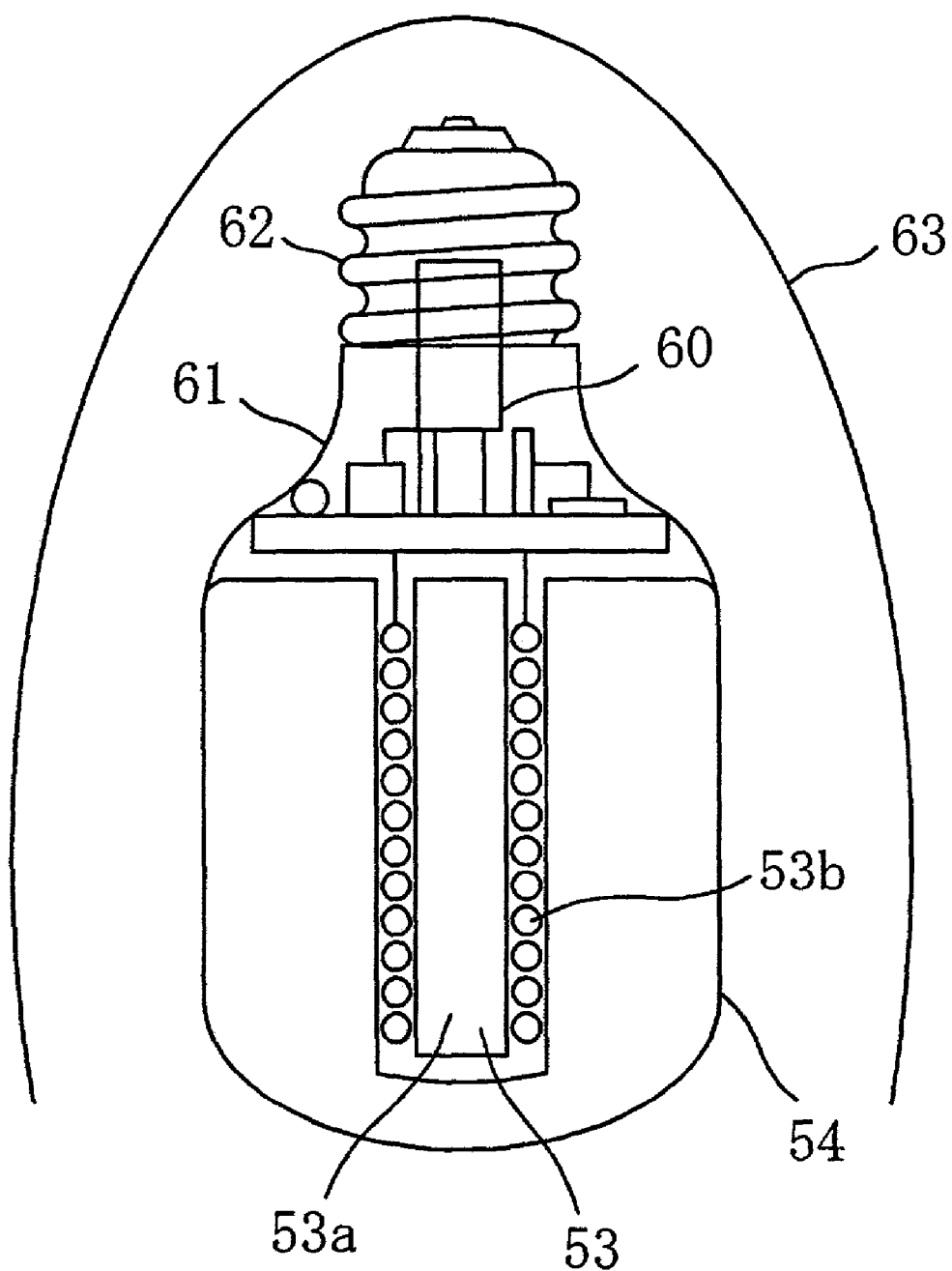
FIG. 5 is a schematic view showing the structure of an alternative light source to an incandescent lamp, which is an example of the cases where the discharge lamp operating apparatus of Embodiment 2 of the present invention is put in practical use.

Next, a discharge lamp operating apparatus of Embodiment 2 of the present invention will be described with reference to FIGS. 5 and 6. The discharge lamp operating apparatus of this embodiment is an operating apparatus for an electrodeless discharge lamp having no electrodes as a discharge lamp. FIG. 4 is a schematic circuit diagram showing the structure of this embodiment.

The DC power circuit portion 22 and the inverter circuit 31 in the discharge lamp operating apparatus shown in FIG. 4 have the same structures as in Embodiment 1 as above. Similarly to Embodiment 1, a resistor 50, which is an impedance element, is inserted in series with the Zener diodes 15 and 16, which are voltage clamp elements, in the control terminal driving circuit 56 of this embodiment. Other aspects in the control terminal driving circuit 56 have the same structures in those of the control terminal driving circuit 23 shown in FIG. 6.

The discharge lamp operating apparatus of this embodiment is very different from Embodiment 1 in the structure of the resonant load circuit 55. This results from the feature that the discharge lamp operating apparatus of this embodiment is an apparatus for operating an electrodeless discharge lamp. Other aspects are basically the same as in the structure of Embodiment 1, so that the same description will be omitted for simplification.

The resonant load circuit 55 of this embodiment includes a primary winding 10B of a transformer 10, which is a first inductor, a capacitor 52, which is a first capacitor, a capacitor 51, an inductor 53, and a discharge lamp 54 having an electrodeless structure. The discharge lamp 54 is an electrodeless discharge lamp that emits light in an electromagnetic field generated by current flowing through the inductor 53.

Before the discharge lamp 54 starts discharge, a high voltage is generated at both ends of the inductor 53 by a resonance function of the primary winding 10B, the capacitors 51 and 52 and the inductor 53, and thus the FETs 5 and 6 of the inverter 31 are operated to be on or off so as to generate an intense electromagnetic filed for allowing the discharge lamp 54 to start discharge.

On the other hand, after the discharge lamp 54 starts discharge, the structure is changed to be such in which a discharge impedance is inserted in parallel to the inductor 53 from the viewpoint of the equivalent circuit, so that a predetermined electromagnetic field is generated from the inductor 53 so as to supply a predetermined power to the discharge lamp 54.

It should be noted that the impedance at both ends of the inductor 53 is constantly inductive before and after the discharge lamp 54 is operated, so that phase correction is performed by the capacitors 51 and 52 and the primary winding 10B of the transformer 10 so that the input impedance of the resonant load circuit 55 becomes substantially resistive. That is to say, the capacitors 51 and 52 and the primary winding 10B of the transformer 10 have a function of supplying a predetermined electromagnetic field to the discharge lamp 54 and a phase correction function of changing the input impedance of the resonant load circuit 55 to be substantially resistive.

Also in the structure as described above, a voltage generated at both ends of the secondary winding 10A of the transformer 10 is very different between before and after the discharge lamp 54 starts discharge.

If the resistor 50 is inserted in the same manner as this embodiment, the FETs 5 and 6 are operated to be on or off at a resonance frequency of the inductor 11 and the capacitor 17 at any occasions as in Embodiment 1. As a result, a voltage for starting the discharge lamp 54 reliably can be generated at both ends of the inductor 53, and thus the discharge lamp can start its operation reliably. It is preferable that the resistance of the resistor 50 is 10 Ω or more and 500 Ω or less as in Embodiment 1.

Furthermore, an example of the structure when the electrodeless discharge lamp operating apparatus having the above-described structure is put in practical use is schematically shown. The discharge lamp operating apparatus shown in FIG. 5 has an electrodeless self-ballasted fluorescent lamp. In other words, the discharge lamp operating apparatus shown in FIG. 5 is an alternative light source to an incandescent lamp that integrally includes the discharge lamp operating apparatus having the structure shown in FIG. 4 and has the shape of an incandescent lamp.

The discharge lamp 54 includes a bulb having a hollow portion, and the inductor 53 is inserted in the hollow portion. The inductor 53 has a structure in which a rod-like ferrite core 53a is wound by winding 53b. The other components of the resonant load circuit than the inductor 53, the control terminal driving circuit 56, the inverter circuit 31 and the DC power circuit portion 22 (except the power source 1) are configured to be a driving circuit 60 for supplying power to the inductor 53, and the driving circuit 60 is disposed in a housing case 61. An alternating power (corresponding to the power source 1 in FIG. 4) applied to the driving circuit 60 is supplied from a lamp base 62.

In practical use of the alternative light source to an incandescent lamp, the following cases can be thought of: a case where it is simply inserted into a socket for an incandescent lamp and a case where it is inserted into a lighting fitting (cover) 63 provided with a socket for an incandescent lamp. The lighting fitting 63 is a lighting cover that covers the side of the lamp apart from the electrodeless discharge lamp 54, and has an opening in the direction to which light emits from the lamp, and is made of, for example, a metal. The direction to which light emits from the lamp is downward when it is a downlight, and is upward when it is an uplight, for example.

Table 1 shows an example of the results measuring the reactance (L value) and the resistance (R value) of the inductor 53 in the case where the lighting fitting 63 is not provided, in the case where the lighting fitting 63 is made of aluminum, and in the case where the lighting fitting 63 is made of iron.

TABLE 1

|  | L value | R value |
|---|---|---|
| No fitting | 370 μH | 0.66 Ω |
| Fitting made of aluminum | 315 μH | 0.73 Ω |
| Fitting made of iron | 370 μH | 1.11 Ω |

The inductor 53 is an open magnetic circuit constituted by the rod-like ferrite core 53a, so that when a metal is present around the inductor 53, the magnetic flux distribution or the like can be affected.

Comparing to the case where the lighting fitting 63 is not provided, a larger reduction in the L value is shown when the lighting fitting 63 made of aluminum is provided. On the other hand, a larger increase in the R value is shown when the lighting fitting 63 made of iron is provided.

The reason for this seems to be as follows. It seems that the L value is reduced because the magnetic flux is shielded so that the magnetic flux distribution is changed when the fitting made of aluminum having a small resistivity is provided. On the other hand, it seems that when the fitting is made of iron whose resistivity is larger than that of aluminum, a change in the magnetic flux distribution is small and there is no variation in the L value, but an eddy current loss is likely to occur, and therefore the R value is increased.

Here, the reduction in the L value or the increase in the R value leads to a reduction in the Q value of the inductor 53. When the Q value is reduced, a high voltage at both ends of the inductor 53 that is necessary for the discharge lamp 54 to start discharge is reduced, which makes it difficult to generate an intense electromagnetic field for the discharge lamp 54 to start discharge. Thus, the startability of the discharge lamp 54 is deteriorated significantly. In other words, it is necessary to reduce further a discrepancy between the resonance frequency of the resonant load circuit 55 and the on/off frequency of the inverter circuit 31 in this embodiment.

According to the experiment of the inventors of the present invention, when the resistor 50 had a resistance of 0 Ω, the following occurred. Even if the discharge lamp 54 was operated under the condition that the lighting fitting (cover) 63 was not provided, the discharge lamp 54 could not be operated when the lighting fitting 63 was provided. When the resistor 50 had a resistance of 10 Ω or more, the discharge lamp 54 was operated whether or not the lighting fitting 63 was provided.

As described above, the discharge lamp 54 can be operated reliably in a simple structure in which the resistor 50 having a resistance of 10 Ω or more is inserted. If the resistance of the resistor 50 is too large, the signal current for turning the FETs 5 and 6 on or off is too small, so that the loss at the time of turning the FETs 5 and 6 on or off is increased. Consequently, it is preferable that the resistor 50 has a resistance of 500 Ω or less.

In the above embodiments, the resonant load circuit 30 or 55 can have other structures, and any structure that has at least the discharge lamp, the first inductor 10B, and the first capacitor 7 or 52 can be used.

The DC power circuit portion 22 is a circuit for converting an alternating current to a direct current that is constituted by the noise prevention capacitor 2 connected to the AC power 1, the diode bridge 3 and the smoothing capacitor 4, but a DC power can be used, as described above.

The inverter circuit 31 is of a half bridge system constituted by the FETs 5 and 6, but other structures such as a one-piece inverter circuit, a full bridge inverter circuit can be used. In this embodiment, the second capacitor 17 is used, but it is possible to configure the structure of the present invention without the capacitor 17, because a predetermined capacitance is present between the gate and the source of the FETs 5 and 6, and the capacitance between the gate and the source can be substituted for the capacitor 17 as an equivalent. In this embodiment, the second inductor 11 is used, but the secondary winding 10A of the transformer 10 has a predetermined reactance, and if the reactance of the secondary winding 10A of the transformer 10 is substituted for the second inductor 11, the structure of the present invention can be achieved without the second inductor 11.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A discharge lamp operating apparatus comprising:
   a DC power circuit portion for outputting a DC voltage;
   an inverter circuit including a switching element provided with a control terminal for converting an output form the DC power circuit portion to an AC voltage;
   a control terminal driving circuit for controlling the switching element provided with a control terminal to be on or off; and
   a resonant load circuit including a discharge lamp, a first inductor and a first capacitor,
   wherein the control terminal driving circuit comprises:
   a drive winding mutually coupled to the first inductor;
   a first series connection of a second inductor and a second capacitor;
   a second series connection of voltage clamp elements and an impedance element;
   a first parallel connection of the first series connection and the drive winding; and
   a second parallel connection of the second series connection and the second capacitor, and
   the control terminal driving circuit controls the switching element provided with a control terminal to be on or off by a voltage generated at the drive winding,
   wherein series connection of the clamp elements and the impedance element operably suppresses variations in the resonance frequency of the control terminal driving circuit.

2. The discharge lamp operating apparatus according to claim 1,
   wherein the control terminal driving circuit further includes a second capacitor connected in parallel to the series circuit of the voltage clamp element and the impedance element, and
   the voltage clamp element becomes conductive when an alternating current signal generated in the second capacitor is a predetermined value or more.

3. The discharge lamp operating apparatus according to claim 2,
   wherein the control terminal driving circuit further includes a second inductor, and
   a closed circuit is formed by the drive winding, the second capacitor and the second inductor.

4. The discharge lamp operating apparatus according to claim 1,
wherein a lower limit of a resistance of the impedance element is 10 Ω.

5. The discharge lamp operating apparatus according to claim 4,
wherein an upper limit of a resistance of the impedance element is 500 Ω.

6. The discharge lamp operating apparatus according to claim 1, wherein the impedance element is a resistor.

7. A self-ballasted electrodeless discharge lamp comprising an electrodeless discharge lamp, a ballast for supplying power to the electrodeless discharge lamp, and a lamp base that are formed into one piece,
the ballast comprising:
a DC power circuit portion for outputting a DC voltage that is electrically connected to the lamp base;
an inverter circuit including a switching element provided with a control terminal for converting an output from the DC power circuit portion to an AC voltage;
a control terminal driving circuit for controlling the switching element provided with a control terminal to be on or off; and
a resonant load circuit including the electrodeless discharge lamp, a first inductor and a first capacitor,
wherein the control terminal driving circuit comprises:
a drive winding mutually coupled to the first inductor;
a first series connection of a second inductor and a second capacitor;
a second series connection of voltage clamp elements and an impedance element;
a second parallel connection of the second series connection and the second capacitor, and
the control terminal driving circuit controls the switching element provided with a control terminal to be on or off by a voltage generated at the drive winding,
wherein series connection of the clamp elements and the impedance element operably suppresses variations in the resonance frequency of the control terminal driving circuit.

8. The self-ballasted electrodeless discharge lamp according to claim 7, further comprising a lighting cover for covering the electrodeless discharge lamp, the ballast and the lamp base that has an opening in a light emitting direction.

* * * * *